United States Patent [19]

Toulhoat et al.

[11] Patent Number: 4,584,093

[45] Date of Patent: Apr. 22, 1986

[54] PROCESS FOR THE HYDROTREATMENT OF HYDROCARBON OIL EMPLOYING CATALYSTS BASED ON ALUMINA, SILICA OR SILICA-ALUMINA

[75] Inventors: Hervé Toulhoat, Le Pecq; Jean-Claude Plumail, Le Vesinet; Marc Mercier, Ales; Yves Jacquin, Sevres, all of France

[73] Assignee: Ste Francaise des Produits pour Catalyse Pro-Catalyse chez Institut Francais du Petrole, Rueil-Malmaison, France

[21] Appl. No.: 693,087

[22] Filed: Jan. 22, 1985

Related U.S. Application Data

[62] Division of Ser. No. 544,148, Oct. 21, 1983, Pat. No. 4,510,255.

[30] Foreign Application Priority Data

Oct. 21, 1982 [FR] France ............................... 82 17769

[51] Int. Cl.$^4$ ........................................... C10G 45/04
[52] U.S. Cl. ................................ 208/216 R; 208/112; 208/111; 208/251 H; 208/254 H; 502/355
[58] Field of Search ............... 208/216 R, 217, 251 H, 208/254 H, 108, 112, 111; 502/355, 332

[56] References Cited

U.S. PATENT DOCUMENTS

| | | | |
|---|---|---|---|
| 3,206,391 | 9/1965 | Gutberlet | 208/110 |
| 4,081,405 | 3/1978 | Sawyer | 502/254 |
| 4,212,771 | 7/1980 | Hamner | 502/254 |
| 4,215,017 | 7/1980 | Reusser et al. | 502/254 |
| 4,374,020 | 2/1983 | Trevino | 208/216 R |
| 4,410,450 | 10/1983 | Sasaki et al. | 502/215 |
| 4,498,972 | 2/1985 | Toulhoat et al. | 208/216 R |

*Primary Examiner*—John Doll
*Assistant Examiner*—Anthony McFarlane
*Attorney, Agent, or Firm*—Millen & White

[57] ABSTRACT

Supported catalysts which are made by shaping catalyst carrier, with or without catalyst precursors, into balls, calcining the balls at 300°–1000° C., and crushing the calcined balls to particles whose average size is 0.2–0.8 times the average diameter of the balls. When the precursors are not present during the manufacture, they are added thereafter.

19 Claims, 5 Drawing Figures

FIG. IA
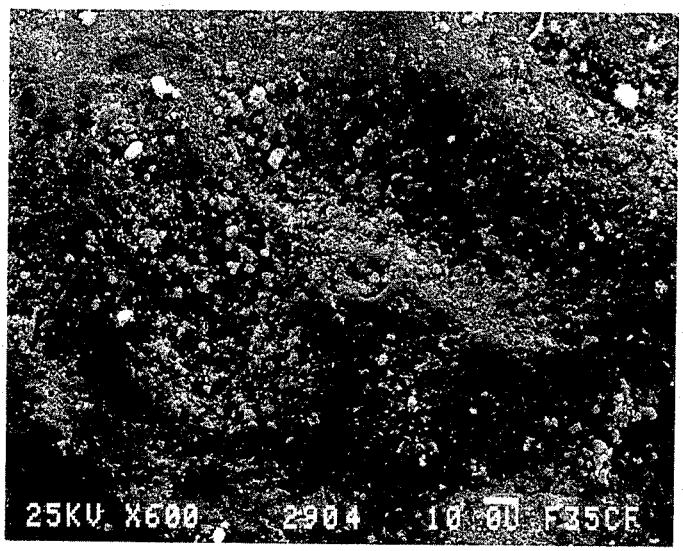
FIG. IB
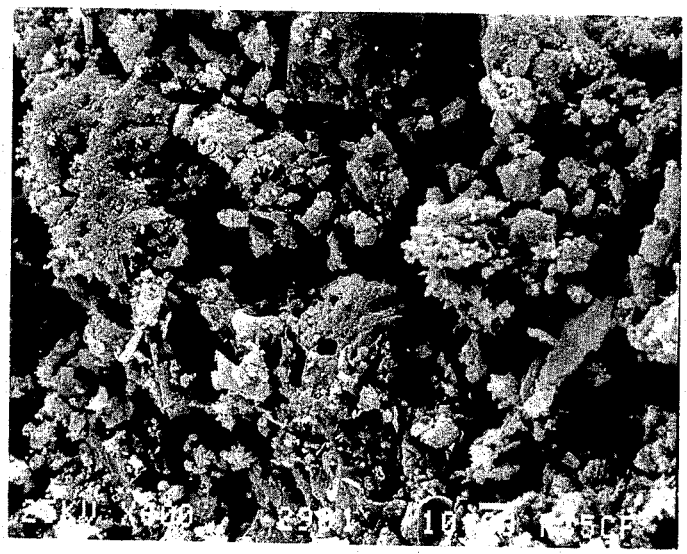

PROCESS FOR THE HYDROTREATMENT OF HYDROCARBON OIL EMPLOYING CATALYSTS BASED ON ALUMINA, SILICA OR SILICA-ALUMINA

This is a division of application Ser. No. 544,148, filed Oct. 21, 1983, now U.S. Pat. No 4,510,255.

BACKGROUND OF THE INVENTION

The invention relates to catalysts with an alumina, silica or silica-alumina base, their manufacture and their use, particularly for hydrotreating hydrocarbon oils, specially oils from petroleum petroleum fractions or coal hydrogenation.

The catalysts which are conventionally used in the domain of hydrorefining oil or oil fractions comprises a carrier such as alumina, silica or silica-alumina and at least one metal or compound of a metal from group V and/or VI and/or VIII, particularly vanadium, mobybdenum, tungsten, nickel, cobalt, iron or the nobble metals. Alumina (or silica) can be pure or comprise additional components, depending on the expected use, for example alkali metals or alkaline-earth metals, rare earth metals silica (or alumina), magnesia, thoria, halogen, in a proportion which can reach 10%, sometimes 30% or more. To simplify, all these materials will be called "support material" in the following disclosure.

These catalysts may appear under various shapes, for example powder, spherical or avoid balls, extrudates of circular or polylobal cross-section, pellets. For use in fixed, moving or expanded bed, it is usual to employ balls having diameters between 1 and 4 mm.

These balls can be manufactured by agglomerating powder of support material according to a number of known techniques, for example in a revolving bowl-granulator or in hot oil by the method of drop coagulation ("oil up" and "oil drop"), optionally after addition of pore-forming agents well known in the art. The resultant balls are then calcined at 300°–1000° C.

Whenever necessary, agents for forming the balls or for maintaining their strength are added to the powder to be agglomerated or to the wetting liquid. These additives which can be, for example, easily rehydratable alumina, alumina or silica gel diluted with water, nitric acid, etc, are well known in the art.

The balls are then "matured", i.e. maintained in a wet atmosphere at a moderate temperature, for example between about 60 and about 100° C., then dried at about 100° to 200° C. and calcined at about 300° to 1000° C. (activation treatment).

Another method for manufacturing balls consists of using the technique known in the art as "oil drop" or "oil up", which consists of introducing a fluid paste based on silica, alumina or silica-alumina into a reactor filled with a generally hot, conveniently selected liquid. This fluid paste is shaped into small particles by passage through an injector of convenient diameter. These particles can be injected at the bottom of the reactor (oil up) and move upwardly, as a result of the differential density, through the hot liquid, while forming substantially spherical balls. They can also be injected (oil drop) at the top of the reactor and flow downwardly by gravity while forming balls. The resulting products are then generally dried and calcined, for example at 300°–1000° C.

The calcined balls can then be used as catalyst carrier: they are impregnated with a solution of the catalytic elements or their precursors. However, the catalytic elements or their precursors can be introduced into the alumina powder and the resultant mixture subjected to the above operations of shaping, drying and calcining, for example at 300°–1000° C.

For certain applications, when the balls comprise alumina, it can be advantageous to subject the calcined balls to a subsequent treatment with water or steam, called "autoclaving", at a temperature comprised between about 80° C. and about 300° C. for about 5 minutes to 48 hours, preferably 1 to 6 hours.

The aqueous "autoclaving" medium preferably contains at least one acid able to dissolve a portion of the alumina of the agglomerates, or a mixture of such an acid with at least one compound supplying an anion able to combine with the aluminum ions, for example a mixture of nitric acid with acetic or formic acid.

The balls obtained from the "autoclaving" are then dried and activated by heating at a temperature of about 300° to 1000° C.

The above "autoclaving" technique is disclosed, for example, in the French Pat. No. 2496631.

When using the "autoclaving", the catalytic materials or their precursors can be introduced either before agglomeration of the alumina powder or after the calcination following this agglomeration, as shown above, or preferably after the "autoclaving" treatment and the subsequent thermal activation. In the latter case, after introduction of the catalytic elements, the material is dried and calcined at 300°–1000° C. and/or reduced, according to known techniques.

The resultant balls have usually a surface of 50 to 350 $m^2/g$, preferably 100 to 250 $m^2/g$ and a total pore volume of 0.4 to 1.5 cc/g, preferably 0.8 to 1.2 cc/g.

The autoclaving treatment and/or the thermal treatments modify the structure of the alumina and/or silica and their characteristics, specially the specific surface and the porosity, this modification being useful for certain catalytic uses, among which is hydrorefining. More particularly, the autoclaving treatment, particularly when performed in acid medium, confers upon the hydrorefining catalysts of the type disclosed above, containing alumina, an outstanding resistance to poisoning by metal and/or asphaltenes fouling.

SUMMARY OF THE INVENTION

The catalysts of the invention have a particular utility in the field of the hydrotreatment (hydrodesulfurization, hydrodenitrogenation, hydrocracking, hydrodemetalation) of hydrocarbon oils containing metals and asphaltenes, for example crude oil, atmospheric or vacuum distillation residues, deasphalted residues, extracts from bituminous sands or shales, coal liquefaction products. However these catalysts have many other uses such as, for example, gasoline and naphthareforming, hydrogenation and treatment of the exhaust gas from internal combustion engines.

A treatment has now been discovered, permitting a substantial improvement in the activity and the life time of catalysts with an alumina or silica base, in the form of balls, whether or not they are subjected to autoclaving in acid medium. This treatment consists of coarsely crushing the balls and recovering particles whose average size is 0.2 to 0.8 times the average diameter of the balls. The process is advantageously effected, so as to obtain particles of an average size (i.e. the average of the smaller and the larger sizes) between 0.5 and 4 mm, preferably between 0.8 and 2 mm.

BRIEF DESCRIPTION OF THE DRAWINGS

FIGS. 1A and 1B are scanning electron micrographs of the surface of a ball of catalyst (1A) and the breaking surface of a crushed catalyst particle (1B), respectively.

DETAILED DISCUSSION

Figure 2:
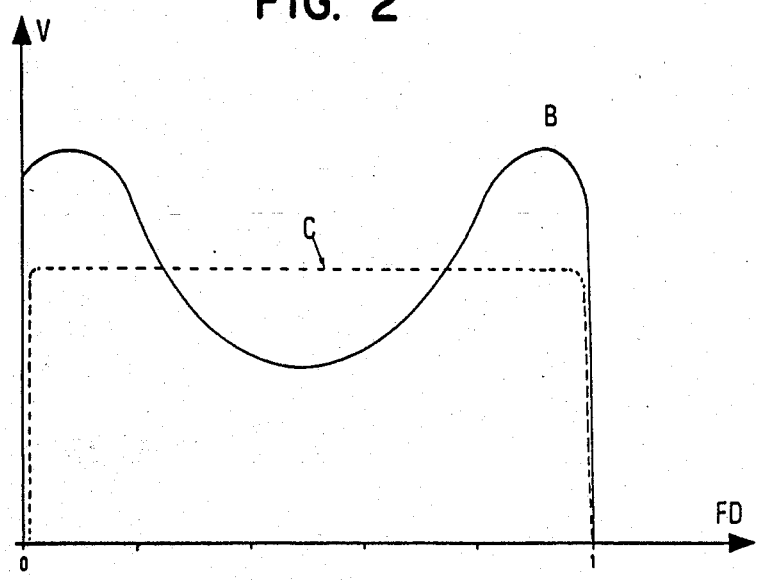
FIGS. 2-4 are plots of metal content vs. the fraction of the particle diameter, obtained by scanning electron microscopy using a microprobe permitting continuous recording of the metal distribution profile. In each case, curve B refers to uncrushed balls and curve C to crushed balls.
Figure 3:
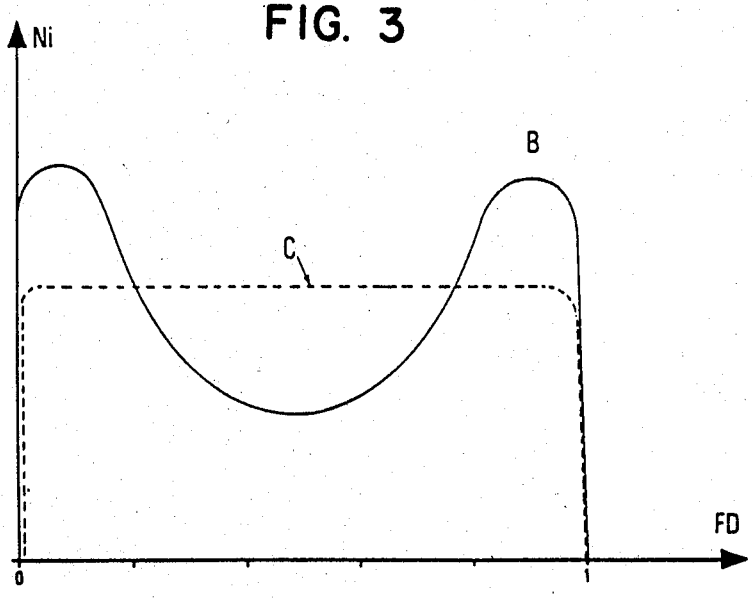

The too small particles, for example of average size lower than 0.5 mm, will be discarded when the object is to use the catalyst in fixed, moving or expanded bed; however these small particles can be used in the processes operated with a catalyst dispersed in the liquid phase.

The crushing can be applied either to catalyst balls, properly speaking i.e. balls already containing all or part of the catalytic elements, or to silica or alumina balls which do not already contain the catalytic elements—or contain only a portion thereof. The latter method is preferred since it leads to the more active catalysts; in the case, the broken particles of the balls are subjected to an impregnation with the catalytic elements, a drying and a final calcination.

To obtain particles of the desired size, it is preferable to start with (spherical or ovoid) balls of average diameter greater than 2 mm, for example between 3 and 10 mm.

The crushing of the balls is preferably such that the ratio of the average size of the particles of crushed catalyst to the average diameter of the starting balls is at least 0.2 and at most 0.8. These sizes can be determined with a sample representative of crushed balls or particles, for example with the use of a series of sieves.

The crushing can be effected in any apparatus known in the art, such as a grip crusher, a ball crusher or a roll crusher.

The crushing is preferably performed in two steps. In the first step, the distance between the grips of the crusher is relatively large. The resultant products are sieved. The fraction with a particle size above that desired is recycled to the same crusher or to another crusher having a distance between the grips or the rolls lower than that of the initial crusher or equal thereto. The ratio between these distances is advantageously between 1 and 0.4. The resultant products are sieved again and the rejects are recycled to the granulation step or used for other purposes, for example as primers in a granulator.

Scanning electron microscopy has explained, to a certain extent, the beneficial effect attributable to the crushing on the activity and the life time of the catalysts: the inspection of pictures (enlargement: 600) obtained with an alumina ball shows that the breaking surface of an alumina ball (FIG. 1b) has relatively numerous pores, making the access of the reactants easier, whereas the pores of the external surface of the ball (FIG. 1a) are relatively plugged. This surface plugging appears the greater as the balls have been subjected to a larger number of treatments in the course of their manufacture. It is thus more substantial with "autoclaved" alumina balls than with the same balls before "autoclaving".

By way of example, the present process applies with a particularly great success to the catalysts disclosed in the U.S. patent application Ser. No. 505,557 of June 17, 1983. In these catalysts, alumina appears as agglomerates of small acicular plates, the plates of each agglomerate being oriented generally radially to one another and to the center of the agglomerate. The latter are already highly resistant to poisoning by pore plugging with deposited solid materials of quite variable nature: not only asphaltenes and metals or metal compounds from the charge, when present therein, but also coke, sodium chloride, suspended clay, particles formed by attrition of the catalysts, this list being not exhaustive. The present process further increases the resistance to poisoning of the catalysts of the above U.S. application.

When using the catalysts of the invention to hydrorefine impure hydrocarbon oils, recovered directly or indirectly from oil or coal, the selected operating conditions are advantageously as follows: temperature of 370° to 470° C., pressure of 50 to 300 bars, oil space velocity of 0.2 to 5 volumes per volume of catalyst per hour. The hydrogen gas/oil ratio by volume is usually 200 to 5000 normal liters per liter.

EXAMPLE 1

Alumina balls with the following characteristics are crushed in a double-roll crusher with variable spacing:
Tpv=110 cc/100 g (Tpv=total pore volume)
S=170 m$^2$/g
Particle size=3-5 mm The selected distance between the two rolls is 3 mm; after a first passage in the apparatus, the resultant products are sieved and the following particle distribution is obtained:
<1 mm: 28% Yield of desired fraction
<2 mm: 60% (1-2 mm)=32%
<3 mm: 100%

The 2-3 mm fraction is recovered and passed again in a crusher, with a spacing of 2 mm between the rolls after sieving, the aggregate products prepared in these two operations have the following distribution:
<1 mm: 43% Yield of desired fraction
<2 mm: 100% (1-2 mm)=57%

The fraction with a particle diameter lower than 1 mm is used to initiate the granulation.

The result obtained at the end of the second passage clearly demonstrates the increased yield of useful fraction.

EXAMPLE 2

Two catalysts A and B are prepared according to the same procedure, called dry impregnation, in one step, from the respective carriers A1 and B1. Carrier A1 is in the form of alumina balls of a diameter between 1 and 2 mm, and carrier B1 in the form of balls of the same alumina, but with a diameter between 3 and 4 mm.

Catalyst A is prepared as follows: 85 g of ammonium heptamolybdate are dissolved into 340 cc of distilled water heated to 60° C. Separately, but simultaneously, 58 g of nickel nitrate are dissolved into 340 cc of distilled water at room temperature. The two solutions thus prepared are admixed and the total volume of the mixture is increased to 1110 cc at 25° C. by water addition. This solution is immediately contacted with 1 kg of the carrier A1. The so impregnated carrier is maintained in moist atmosphere for 12 hours. Then the resultant catalyst is dried in a stream of dry air at 110° C., then calcined for 2 h at 500° C. in a revolving furnace.

Catalyst B is prepared by the same method from 1 kg of carrier B1. However, after the impregnation, moistening, drying and calcining, the resulting balls of catalyst B with a particle diameter of 3 to 4 mm are coarsely crushed and the irregular particles obtained, of an average size between 1 and 2 mm, are recovered. Thus, the chemical nature of the alumina is exactly the same in the catalysts A and B and the average size of the catalyst particles is also the same. It is also observed that the two catalysts have the same specific surface (determined by the so-called BET method of nitrogen adsorption), the same total pore volume, the same particle density and the same structural density. Only the shape of the particles is different.

The chemical composition of the catalysts is the following:

$Al_2O_3 \times 91.5\%$ b.w.
$MoO_3 = 7.0\%$ b.w.
$NiO = 1.5\%$ b.w.

The even distribution of the metals deposited on the carriers is ascertained with the Castaing microprobe method by scanning electron microscopy (Cameca probe).

The two catalysts are tested in a traversed fixed bed unit. The catalyst volume is 1000 cc. The operating conditions are the following:

Total pressure = 100 bars
Space velocity = 1 l of charge/l of catalyst/hour.
$H_2$/charge = 1000 m$^3$/m$^3$
Presulfurization of the catalyst with hydrogen gas+$H_2S$ (3%) mixture at 350° C. for 6 h under atmospheric pressure.

The charge consists of deasphalted oil extracted from a Venezuelian Boscan crudeoil (Boscan DAO), whose characteristics are the following:

Specific gravity at 20° C. = 0.989 g/cc
Viscosity at 100° C. = 161 mm$^2$/s
Viscosity at 150° C. = 25.3 mm$^2$/s
Conradson carbon = 10.3% b.w.
Insoluble in n-heptane = 0.17% b.w.
Insoluble in n-pentane = 1.7% b.w
Resins separated with isopropanol = 10% b.w
Total sulfur = 5.16% b.w
Total nitrogen = 3990 ppm b.w
Nickel = 47 ppm b.w
Vanadium = 400 ppm b.w
ASTM distillation:
 initial point = 240° C.
 50% point = 550° C.

During the test, the temperature is successively 360° C., 380° C., 400° C., 420° C. and 380° C. (called return temperature). While the temperatures vary, the catalyst remains always the same.

The results are the following:

point, the pollution rate of the catalyst with the metals of the charge (nickel and vanadium) is 25% b.w (expressed in % b.w of the fresh catalyst). Thus the differences in the demetalation rate and the resin conversion rate show clearly the higher resistance to metal poisoning of the crushed catalyst.

The catalysts A and B, after completion of the activity test, have been examined with the Castaing microprobe method (scanning microscopy operated by reflection), with the use of a Cameca microprobe and the continuous registration method of the distribution profiles of the nickel and vanadium metals in the catalyst particle at the end of the test. The catalyst particle has been cut along the plane comprising the two greater diameters of the particle. In the course of the analysis, the probe moved along one of the particle diameters, thus permitting to characterize the nickel and vanadium deposition in the particles.

The FIGS. 2 et 3 show the results of these analyses. In ordinates, V is the vanadium content and Ni the nickel content; in abcissae, FD is the fraction of the particle diameter. Curve B relates to the uncrushed and curve C to the crushed balls. The catalyst as balls thus shows a selective deposition of the metals near the external surface of the particles, which results in catalyst pore plugging. On the contrary, in the case of the crushed catalyst, nickel and vanadium deposit uniformly in the whole particle.

This comparison example illustrates the difference of activity of catalysts of same particle size, same chemical composition, same structure (determined by the BET method and by mercury porosimetry), when the balls are prepared directly at the diameter at which they are used or when balls of larger size are prepared and crushed to give a fraction of the desired particle size. In both cases, it is observed that the metals deposit in the particles from the exterior up to the interior. The aspect of these deposits is quite different in the two cases; the shape of the deposit obtained with the crushed material appears more advantageous.

EXAMPLE 3

A catalyst D is prepared by the following method: the carrier of catalyst B is crushed before impregnation. The fraction of particle size between 1 and 2 mm is separated and this carrier is treated by the impregnation technique of example 2 to provide a catalyst having the same composition as the catalysts A and B. The catalyst D is subjected to the test described in example 1 and the result are the following:

|  | CATALYST A | | | CATALYST B | | |
|---|---|---|---|---|---|---|
|  | Demetalation (%) | Desulfuration (%) | Resins Conversion (%) | Demetalation (%) | Desulfuration (%) | Resins Conversion (%) |
| T = 360° C. | 77 | 47 | 27 | 79 | 45 | 32 |
| T = 380° C. | 90 | 63 | 42 | 95 | 60 | 55 |
| T = 400° C. | 96 | 77 | 87 | 98 | 76 | 90 |
| T = 420° C. | 98 | 81 | 95 | 99 | 80 | 95 |
| T = 380° C. | 55 | 28 | 30 | 70 | 30 | 45 |

It appears thus clearly that the demetalation rate and the resin conversion rate are substantially higher with the catalyst in form of crushed particles. This is particularly obvious when coming back to 380° C. At this

| CATALYST D | | |
|---|---|---|
| Demetalation | Desulfurization | Resins conversion |
| (%) | (%) | (%) |
| T = 360° C. 80 | 48 | 38 |

-continued

| | CATALYST D | | |
|---|---|---|---|
| | Demetalation (%) | Desulfurization (%) | Resins conversion (%) |
| T = 380° C. | 96 | 68 | 68 |
| T = 400° C. | 98.5 | 80 | 95 |
| T = 420° C. | 99 | 85 | 98 |
| T = 380° C. | 75 | 35 | 50 |

When comparing these results to those obtained in the same conditions with the catalysts A and B of example 2, it can be observed that the catalysts B and D behave quite similarly with however a better activity and a smaller deactivation when the impregnation follows the crushing.

EXAMPLE 4

The same two catalysts A and B of example 2 are used to perform a long duration test consisting of hydrotreating a Boscan DAO (same charge as in example 2). The operating conditions are identical to those of example 2 with the exception of the temperature which is maintained at 410° C.

It is found that when the proportion of metals (nickel+vanadium) deposited on catalyst A during the test attains 40% (40 g of metals for 100 g of fresh catalyst), the demetalation activity and the resin conversion activity decrease very quickly to a value near zero.

Conversely, when the catalyst B has retained 50% (with respect to its initial weight) of Ni+V, its demetalation activity is again 55%. Even when the metal deposition rate on the crushed catalyst exceeds 120%, the demetalation activity is again 20%. Thus the crushing of the catalyst greatly increases the capacity of metal deposition.

Figure 4:
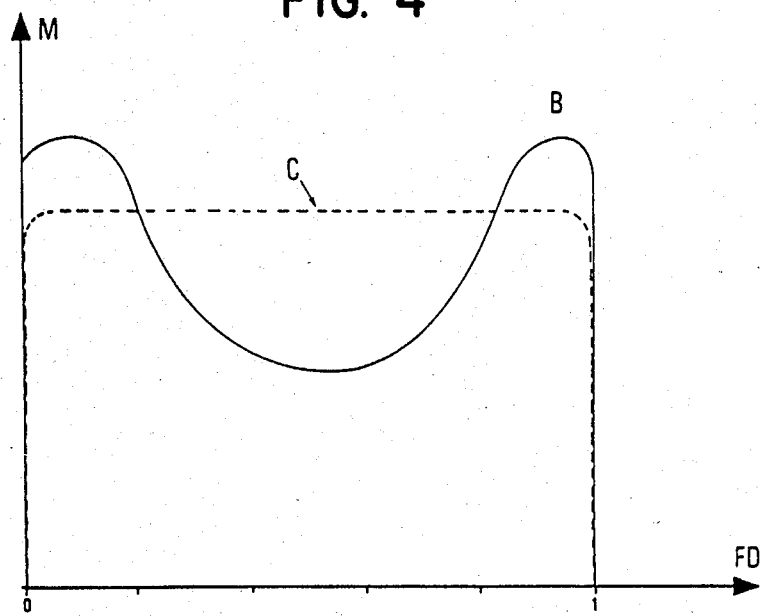

The spent catalysts have been examined by the techniques of the Castaing microprobe as described above. The profiles of metal distribution are given in FIG. 4 (M represents the total metals weight).

A skin metal deposit is thus observed in the catalyst as balls, whereas the deposit is homogeneous in the whole particle for the crushed catalyst. This probably explains the very great capacity of this catalyst to retain nickel and vanadium, which capacity is greater than 120% b.w of the fresh catalyst.

This comparison example illustrates the great improvement of the resistance to deactivation by Ni and V deposition resulting from the use of crushed particles (better specific retention and better activity after Ni and V absorption).

EXAMPLE 5

Two catalysts B and C are prepared. Catalyst B is the catalyst described in example 2. Catalyst C is prepared by the same method. The difference lies in the fact that the size of the catalyst C particles is smaller. The distribution of the particle sizes of catalyst C is between 0.5 mm and 1 mm. The particle size is obtained by a more severe crushing while retaining the crushing criteria indicated above.

These two catalysts are tested in a unit with a traversed fixed bed. The catalyst volume is 1000 cc. The operating conditions are the same as in example 2.

The feed charge is a deasphalted oil whose characteristics are:
density at 20° C.: 1.001 g/cc
viscosity at 100° C.: 290 mm²/s
viscosity at 150° C.: 33.3 mm²/s
Conradson carbon: 11.4% b.w
insoluble in n-heptane: 0.6% b.w
insoluble in n-pentane: 2.5% b.w
resins with isopropanol: 12% b.w
Total nitrogen: 5350 ppm b.w
Total sulfur: 3.90% b.w
nickel: 50 ppm b.w
vanadium: 200 ppm b.w The reaction temperature is successively 360° and 380° C. The demetalation and resin conversion activities are determined for two different poisonings by nickel and vanadium metal deposition at a temperature of 380° C.

The results are the following:

| Temperature (°C.) | Poisoning by Ni + V | CATALYST C | | | CATALYST B | | |
|---|---|---|---|---|---|---|---|
| | | Demetalation (%) | Desulfurization (%) | Resins conversion (%) | Demetalation (%) | Desulfurization. (%) | Resins conversion. (%) |
| 360 | 3% | 96.2 | 64 | 35 | 95.8 | 63 | 35 |
| 380 | 6% | 99.3 | 76.5 | 57 | 99.5 | 75 | 58 |
| 380 | 20% | 93 | 43.3 | 33 | 93.5 | 44 | 33 |

These results show that a reduction of the particle size by more severe crushing does not improve the activity of the catalysts in the conditions of the experiments. The initial crushing is sufficient to avoid the problems of the charge diffusion throughout the catalyst. Thus these problems are only attributable to the plugging of the external surface of the catalyst particles.

EXAMPLE 6

Catalysts A and B of the above examples are tested for hydrotreatment activity with an asphaltene-containing crude oil of the Venezuelan type.

The test material is the same as above and the operating conditions are the following:
space velocity: 0.5 l of feed/l of catalyst/hour.
temperature: 420° C.
pressure: 150 bars
presulfurization of the catalyst as described in example 2.

The feed charge to be tested is a Venezuelan crude with the following characteristics:
density at 20° C.: 1.0145 g/cc
viscosity at 100° C.: 78 mm2/s
Total sulfur: 3.60% b.w
Total nitrogen: 6560 ppm b.w
insoluble in n-pentane: 24% b.w
insoluble in n-heptane: 17% b.w
resins insoluble in isopropanol after nC7 asphaltene settling: 12% b.w Catalyst A is completely deactivated when the metal deposit attains 50% b.w Conversely catalyst B remains active, the activity being determined when the metal (Ni+V) deposit attains 80% b.w of the catalyst. The result is:
demetalation: 84%
desulfurization: 52%
resin conversion: 60%
asphaltenes conversion: 60%

The improvements obtained by crushing remain important even when the charge becomes more difficult treat as in this case, in the presence not only of resins but also of asphaltenes; the crushed catalyst behaves substantially better.

EXAMPLE 7

Two catalysts E and F have been prepared by the method of example 2. The differences with the catalysts of example 2 lie in the fact that the carrier is silica and that the deposited metals are nickel and vanadium.

Catalyst E is in the form of balls with a diameter of 1-2 mm. Catalyst F is in the form of crushed particles of 1-2 mm diameter obtained from balls of 3-4 mm.

The composition of the two catalysts is:
$SiO_2$ = 91.5% b.w
$V_2O_5$ = 7.5% b.w
$NiO$ = 1.0% b.w These two catalysts are tested in a unit of the traversed fixed bed type. The volume of catalyst is 500 cc. The operating conditions are the following:
total pressure = 120 bars
space velocity = 1 l of charge/l of catalyst/hour.
$H_2$/feed charge = 1000 $m^3/m^3$
temperature = 380° C.
presulfurization of the catalyst as explained in example 2.

The feed charge is a Boscan crude with the following characteristics:
insoluble in n-heptane = 11% b.w
resins in isopropanol after $C_7$ removal of the asphaltenes = 10% b.w
sulfur = 4.5% b.w
nickel = 100 ppm b.w
vanadium = 1000 ppm b.w
the results are the following:

| Catalyst E | | Catalyst F | |
|---|---|---|---|
| Dematalation | Conversion of the insoluble ($nC_7$) | Demetalation | Conversion of the insoluble ($nC_7$) |
| 75% | 64% | 80% | 70% |

The determination of the conversion rate has been performed when the deposition of nickel and vanadium from the charge on the catalyst was 5% b.w with respect to the fresh catalyst.

It is thus found that the demetalation activity of the catalyst as crushed silica particles is better than that of the catalyst as silica balls.

EXAMPLE 8

Two catalysts G and H have been prepared by the method of example 2. The differences lie in the fact that the carrier of the catalysts G and H is silica obtained by oil drop and that the active phase between 1 and 1.5 mm. Catalyst H is in the form of crushed particles of a size consists of CoO and $MoO_3$. Catalyst G is in the form of balls of diameters between 1 and 1.5 mm, obtained from balls of 2 to 3 mm diameter.

These two catalysts are tested in the same operating conditions and with the same charge as described in example 7.

The results are as follows:

| Catalyst G | | Catalyst H | |
|---|---|---|---|
| Demetalation | Conversion of the insoluble ($C_7$) | Demetalation | Conversion of the insoluble ($C_7$) |
| 77% | 67% | 82% | 73% |

The conversions have been determined when the poisoning of the catalysts with the metals of the charge (nickel+vanadium) was 5% with respect to the weight of the fresh catalyst.

It is thus once more found that the catalytic activity of the crushed catalyst is better than that of the catalyst in the form of balls obtained by the so-called "oil drop" technique.

EXAMPLE 9

A fraction of balls with a particle size of 1.25 to 2.5 mm diameter is selected from a batch of alumina balls with the following structure characteristics: total pore volume = 48 cc/100 g, BET surface = 320 $m^2/g$; the 3 to 6 mm fraction is crushed to prepare crushed particles of 1.25-2.5 mm diameter. The structure characteristics of the balls are not modified by the crushing. The balls are prepared by agglomeration in a bowl granulator of flashed hydrargillite powder (brought to a temperature higher than 600° C. for a very short time).

The two fractions whose manufacture has been described above are used to prepare catalysts of the following composition:
$MoO_3$ = 14% b.w
$CoO$ = 3% b.w
$Al_2O_3$ = 83% b.w The technique is the double impregnation technique wherein mobybdenum is introduced in the form of an ammonium heptamolybdate solution in water. The catalyst is dried and calcined at 300° C.; then a second impregnation with a cobalt nitrate solution is performed. The catalyst is then dried and calcined in an air stream at 520° C. The catalyst in the form of balls will be hereinafter designated as I and the catalyst in the form of crushed particles as J.

80 cc of the catalysts I and J are introduced into a pilot unit fed with an Aramco vacuum distillate.

The characteristics of this oil fraction are the following:
density at 20° C. = 0.906 $g/m^3$
viscosity at 100° C. = 11.8 $mm^2/s$
sulfur = 2.53% b.w
total nitrogen = 1500 ppm b.w
ASTM distillation D1160° (C.):
IP = 350
10% = 455
50% = 487
90% = 523

The experiments are performed after presulfurization of the catalysts for 6 h with hydrogen containing 3% by volume of hydrogen sulfide at 350° C. under 45 bars (feed rate: 100 N liters/hour).

The experiment is performed in the following conditions:
Total pressure: 45 bars
Hydrogen/hydrocarbons ratio in l/l: 350

VVH: 1.33 liter of distillate per liter of catalyst per hour.

The desulfurization results after 60 h of run are the following (% desulfuration):

Catalyst I (balls): 87.3%
Catalyst J (crushed particles): 91%

It is found that the improvement obtained by the crushing of alumina balls also applies to balls not subjected to autoclaving and that the activity improvement is important when the feed charge is a distillate.

EXAMPLE 10

The following catalysts are prepared from a crushed alumina carrier whose 1–2 mm fraction has been retained, the technique being as in example 2. The starting carrier has the following structure:

| Tpv = 110 cc/100 g | | BET surface = 100 m 2/g | | |
|---|---|---|---|---|
| Catalyst | K | L | M | N |
| Composition | CoO: 1.5% MoO$_3$: 7% | Fe$_2$O$_3$: 4% | NiO: 4% | V$_2$O$_5$: 4.4% |

The catalytic properties of these catalysts are controlled by using the charge and the operating conditions of example 2.

The results are the following:
Pressure 100 bars VVH=1

| CATALYST | T = 380° C. | | T = 400° C. | | T = 420° C. | |
|---|---|---|---|---|---|---|
| | HDS | HDM | HDS | HDM | HDS | HDM |
| K | 53% | 82% | 70% | 94% | 82% | 97% |
| L | 9% | 56% | 27% | 84% | 49% | 95% |
| M | 12% | 72% | 34% | 88% | 52% | 95% |
| N | 20% | 77% | 50% | 95% | 70% | 98% |

It is noticeable that all the catalysts give good demetalation results as from 400° C.

The above examples show the high activity of the catalysts of the invention.

As indicated above, the coarse crushing of the invention keeps practically unmodified the structure characteristics of the carriers and of the catalysts, particularly their apparent density and their pore distribution. This distinguishes this crushing from a severe crushing, leading to particles of 10 micrometers or less with undesirable modification of these characteristics.

What is claimed as the invention is:

1. A method for hydrotreating a hydrocarbon oil, which comprises contacting the hydrocarbon oil with a catalyst in the presence of hydrogen, said catalyst comprising at least one carrier material whose base element is alumina, silica or silica-alumina and at least one active element selected from the metals of groups V, VI and VIII or compounds thereof, wherein the carrier is shaped into balls, said balls are calcined at about 300° to 1000° C. and then crushed and the resultant particles whose average size represents 0.2 to 0.8 times the average diameter of the balls are recovered, and the catalyst is dried and thermally activated.

2. A method according to claim 1, wherein the active elements are incorporated on the carrier before the carrier is shaped into balls.

3. A method according to claim 1, wherein the active elements are incorporated on the carrier after the carrier is crushed and the resultant particles recovered.

4. A method according to claim 1, wherein the hydrocarbon oil contains a member selected from the group consisting of metals, asphaltenes, and mixtures thereof.

5. A method according to claim 1, wherein the catalyst is in the form of a fixed, moving or expanded bed.

6. A method according to claim 5, wherein the average size of the catalyst particles is between 0.5 and 5 mm.

7. A method according to claim 6, wherein hydrotreating is at a temperature of 370° to 470° C. and a pressure of 50 to 300 bars.

8. A method according to claim 7, wherein hydrotreating is at a space velocity of 0.2 to 5 volumes of the hydrocarbon oil per volume of catalyst per hour.

9. A method according to claim 8, wherein 200 to 5000 normal liters of hydrogen are provided per liter of hydrocarbon oil.

10. A method for the demetallation, desulfuration and resin conversion of a hydrocarbon oil, which comprises passing the hydrocarbon oil and hydrogen gas through a bed of catalyst particles having an average size between 0.5 and 4 mm, said catalyst comprising at least one carrier material whose base element is alumina, silica or silica-alumina and at least one active element selected from the metals of groups V, VI and VIII or compounds thereof, wherein the carrier is shaped into balls, said balls are calcined at about 300° to 1000° C. and then crushed and the resultant particles whose average size represents 0.2 to 0.8 times the average diameter of the balls are recovered, and the catalyst is dried and activated at a temperature of 370° to 470° C.

11. A method according to claim 10, wherein the active elements are incorporated on the carrier before the carrier is shaped into balls.

12. A method according to claim 10, wherein the active elements are incorporated on the carrier after the carrier is crushed and the resultant particles recovered.

13. A method according to claim 10, wherein the catalyst particles are presulfurized by passing a mixture of hydrogen gas and hydrogen sulfide through the heated catalyst.

14. A method for the hydrorefining of impure hydrocarbon oil recovered directly or indirectly from oil or coal, which comprises passing the impure hydrocarbon oil and hydrogen through a bed of catalyst particles having an average size between 0.5 and 4 mm, said bed being at a temperature of 370° and 470° C. and at a pressure of 50 to 300 bars, the space velocity of said hydrocarbon oil being 0.2 to 5 volumes of oil per volume of catalyst per hour and the hydrogen gas to oil ratio being 200 to 5000 normal liters of hydrogen per liter of oil, said catalyst comprising at least one carrier material whose base element is alumina, silica or silica-alumina and at least one active element selected from the metals of groups V, VI and VIII or compounds thereof, wherein the carrier is shaped into balls, said balls are calcined at about 300° to 1000° C. and then crushed and the resultant particles whose average size represents 0.2 to 0.8 times the average diameter of the balls are recovered, and the catalyst is dried and activated at a temperature of 370° to 470° C.

15. A method according to claim 14, wherein the impure hydrocarbon oil is deasphalted crude oil.

16. A method according to claim 14, wherein the crude oil is a Venezuelian crude.

17. In a method for the hydrorefining of a hydrocarbon oil, the improvement which comprises using as the catalyst at least one carrier material whose base element is alumina, silica or silica-alumina and at least one active element selected from the metals of groups V, VI and VIII or compounds thereof, wherein the carrier is shaped into balls, said balls are calcined at about 300° to 1000° C. and then crushed and the resultant particles whose average size represents 0.2 to 0.8 times the average diameter of the balls are recovered, and the catalyst is dried and activated.

18. A method according to claim 17, wherein the active elements are incorporated on the carrier before the carrier is shaped into balls.

19. A method according to claim 17, wherein the active elements are incorporated on the carrier after the carrier is crushed and the resultant particles recovered.

* * * * *